July 11, 1967 R. B. WILLI 3,330,532
THRUST CONTROL MEANS FOR HYDRAULIC MACHINES
Filed March 23, 1966
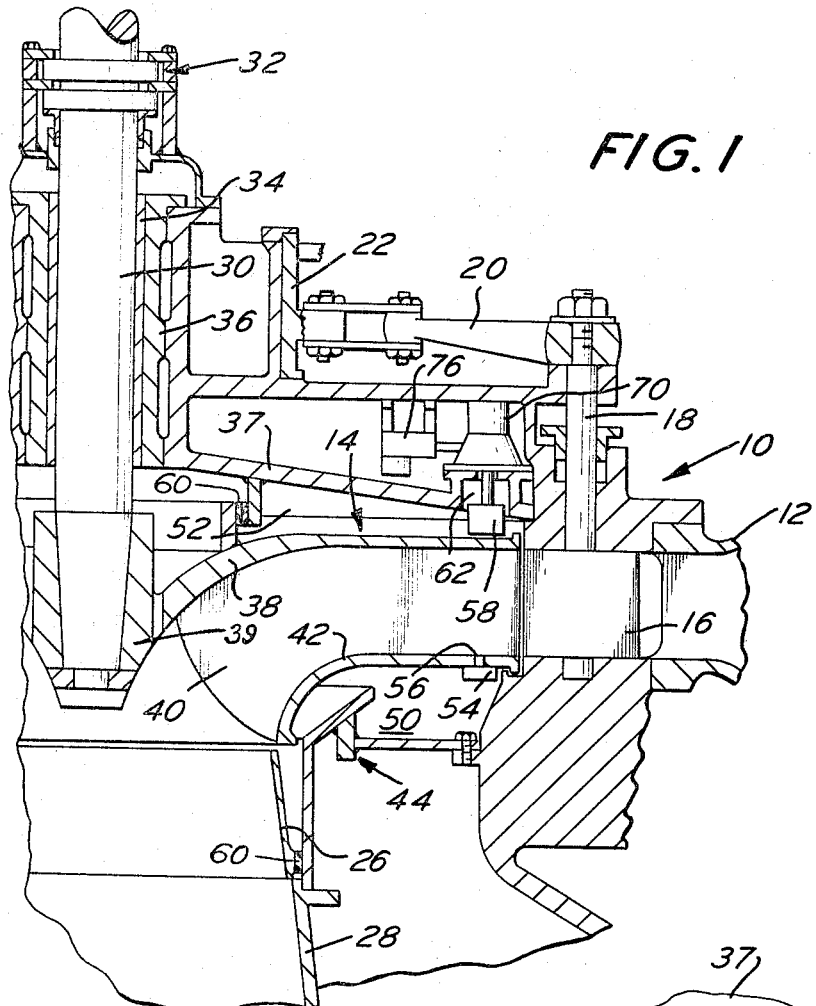
FIG. 1
FIG. 3
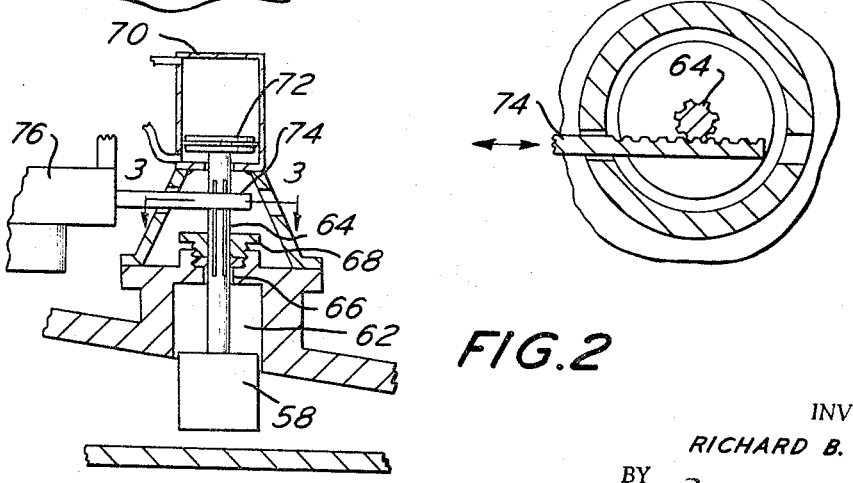
FIG. 2
INVENTOR.
RICHARD B. WILLI
BY
ATTORNEYS.

United States Patent Office 3,330,532
Patented July 11, 1967

3,330,532
THRUST CONTROL MEANS FOR HYDRAULIC
MACHINES
Richard B. Willi, Norristown, Pa., assignor to Baldwin-Lima-Hamilton Corporation, Philadelphia, Pa., a corporation of Delaware
Filed Mar. 23, 1966, Ser. No. 538,172
6 Claims. (Cl. 253—26)

This invention relates to a thrust control means for hydraulic machines and more particularly to a control means in hydraulic machines for controlling the pressure distribution on the runners thereof.

It is to be understood that the term "hydraulic machine" includes both hydraulic turbines and hydraulic pump-turbines. Hydraulic machines, particularly those of the low specific speed Francis type are generally provided with runners which have a relatively long radial dimension towards their outer periphery as compared to their eye or throat diameter. This results in large surface areas above and below runner walls. It is known that water enters above and below the runner walls and fills the spaces between the rotating runner walls and the adjacent stationary covers. The water enters the spaces through the peripheral runner clearance. The water in the spaces is trapped to some extent by the small restraining clearances at the runner seals. Since the water is in contact with the rotating runner surfaces, it has imparted to it a varying degree of swirling or vortex flow caused by such contact. This results in the buildup of pressure variations between the outer periphery of the runner and the runner seals. Depending upon the resultant direction of the pressure variations, upward or downward forces may be exerted on the runner.

The forces exerted result in axial loads on the runner shaft thrust bearing. The loads may become excessive and must be controlled in order to prevent excessive undesirable load conditions on the thrust bearing.

It is desirable to reduce the upward forces exerted on the runner to a value less than the weight of the rotating parts so that the main thrust bearing need not be designed to accept the forces from opposite directions. Upward forces should be avoided in order to keep a steady and positive downward force on the main thrust bearing, which is designed to withstand such force. Should the runner be periodically lifted from the main thrust bearing, hydraulic disturbances and eventual damage to both upward and downward thrust bearings would result. Control of downward forces is also desirable in order that the size of the thrust bearings can be kept smaller and less expensive.

It is an object of this invention to provide a means to the runner of an hydraulic machine.
hydraulic machine.

It is another object of this invention to provide a means for preventing excessive wear and damage to thrust bearings in an hydraulic machine.

It is yet another object of this invention to provide a plurality of rotatable or retractable vanes connected to a stationary cover for increasing the downward pressure on the runner of an hydraulic machines.

It is a further object of this invention to provide a plurality of rotatable or retractable vanes integral with the lower runner wall of an hydraulic machine which decreases the upward forces exerted on the runner.

It is a still further object of this invention to provide a plurality of either fixed, rotatable, or retractable vanes mounted on the upper runner wall which provide for the alternative choice of reducing downward forces and thus enable a smaller size thrust bearing to be utilized.

It is another object of this invention that by providing vanes in a manner to be described hereinafter forces acting upon the runner of an hydraulic machine may be accurately controlled in accordance with the operating condition of the hydraulic machine.

It is another object of this invention to provide a means for improving the operation of an hydraulic machine.

Other objects will appear hereinafter.

In accordance with the present invention a multiple vane arrangement is provided above and below the runner of an hydraulic machine. Stationary or rotatably adjustable vanes may be provided above the runner and connected to the stationary cover and may be designed to retract into pockets within the cover. Fixed or adjustable vanes may be provided below the runner and attached to the lower runner wall to thereby rotate with the runner. Since vortex pressure is greater at the periphery and smaller toward the hub of the runner when rotating flow with centrifugal effects is prevalent, a control of the degree of rotating flow at the periphery is used for controlling the pressure distribution over the surface areas of the runner. This results in a control of the resulting forces on the thrust bearings.

The vanes which are connected to the stationary cover obstruct rotating flow, thereby causing a more static and a higher and more uniform pressure distribution on the top of the runner. Thus, the downward force on the runner is increased by the effect of stationary vanes. Conversely, if such vanes were attached to the top of the runner wall, they would increase rotating flow or vortex action which would reduce the downward force on the runner.

The rotating vanes which may be fixed to the lower runner wall increase the water rotation and centrifugal pressure distribution characteristics. The result is a reduction of upward forces on the runner. Thus, either excessive or all upward forces in accordance with the desired operating characteristics, are avoided in order to keep a steady and positive force on the main downward thrust bearing which is designed to accommodate said forces.

For the purpose of illustrating the invention, there is shown in the drawings a form which is presently preferred; it being being understood, however, that this invention is not limited to the precise arrangements and instrumentalities shown.

FIGURE 1 is a partial section view of an hydraulic machine constructed in accordance with the principles of this invention.

FIGURE 2 is a section view taken along line 2—2 in FIGURE 1.

FIGURE 3 is a section view taken along line 3—3 in FIGURE 2.

Referring to the drawing in detail, wherein like numerals indicate like elements, there is shown in FIGURE 1 a pump-turbine designated generally as 10. While the turbine shown is of the low specific speed Francis type, it is to be understood that this invention is not to be limited to a distinct type of pump-turbine. The invention may be used in various types of hydraulic machines.

The pump-turbine 10 is provided with a spiral casing 12 through which water is delivered to the runner 14 of the pump-turbine. The pump-turbine 10 is provided with a plurality of wicket gates 16 which are rotatably mounted by stems 18. The stems 18 are connected to an arm 20 and a shifting ring 22 which cooperate to control the adjustment of the wicket gates 16.

Water which enters the pump-turbine 10 through the spiral casing 12 is adapted to flow through a discharge ring 26 into a draft tube 28. The pump-turbine 10 is provided with a centrally mounted shaft 30 which is mounted in a radial bearing 34. The shaft 30 has a thrust bearing assembly 32 at its upper end. A bushing 36 surrounds the bearing 34.

The pump-turbine is provided with a stationary cover plate 37 which is stationary and does not rotate with the shaft 30. The runner 14 is connected to the lowermost end of the shaft 30. The runner 14 comprises a hub 39 and a disk 38 which is connected to the shaft 30 for rotation therewith. The disk 38 is provided with a plurality of blades 40 attached thereto. The blades 40 have the outer ends thereof joined by a discharge band or shroud 42. The hub 39 and disk 38 to which the blades 40 and the discharge band 42 are joined, all comprise the runner 14.

The outer surface of the discharge band 42 and the inner surface of the stationary housing 44 cooperate to define a space 50. The space 50 is beneath the runner 14 of the pump-turbine 10. The stationary cover plate 37 and the outer surface of the disk 38 cooperate to define a space 52 therebetween. The space 52 is above the runner 14 of the pump-turbine 10.

A plurality of baffles or vanes 54 are pivotally connected to the discharge band 42 and rotate therewith. The vanes 54 are provided with pivots 56 about which the vanes 54 may be rotated. A plurality of baffles or vanes 58 cooperate with the stationary cover plate 37. The vanes 58 are stationary with respect to the runner 14. The vanes 58 may also be provided with means by which they may be pivoted, similar to the pivots 56 upon which the vanes 54 are mounted. Seals 60 may be provided in the spaces 50 and 52 in a conventional manner.

The vanes 58 may be retractable into pockets 62 provided in the stationary cover plate 37. Similarly, the discharge band 42 may be provided with slots therein so that the vanes 54 could be retracted into such slots.

The structure for retracting and pivoting the vanes 58 will be set forth in detail. Similar structure may also be used to retract and pivot the vanes 54. The vanes 58 are integral with splined vane stems 64. Holes 66 may be provided in the stationary cover plate 37 through which the splined vane stems 64 may extend. Stuffing boxes 68 are provided to prevent leakage. The splined vane stems are integrally connected with pistons 72 housed within a double acting cylinder 70. The pistons 72 may be automatically moved in accordance with the desired position of the vanes 58. Rack members 74 are provided with teeth 76 which are adapted to mesh with the splines on the splined vane stems 64. Movement of the racks 74 will cause the vanes 58 to rotate. The racks 74 may be connected to a control motor 76. Thus, it is readily seen that the control vanes 58 may be extended or retracted into the pockets 62 and when extended, may be rotated by means of the racks 74.

Various other means could be utilized to retract the vanes 58. For example, the vane stem could be threaded and retraction or extension accomplished by a gear internally threaded to mate with the threads on the vane stem. The gear could be held in a fixed axial position and driven by an electric motor. Alternatively, the vane could be hinged and rotated into a pocket rather than moved axially as shown in FIGURES 1–3. The vanes 54 may also be retracted by any of the means hereinabove discussed.

Furthermore, if the reverse operating characteristics were desired, the vanes 58 could be connected to the top of the runner 14 to rotate therewith and the vanes 54 could be connected to housing member 44 and thereby be stationary with respect to said runner. Slots could be provided so that such vanes could be retractable. Pivots could also be provided so that such vanes could be pivotable. It is clear that if the vanes were so positioned an opposite effect would result, i.e., a steady and positive upward thrust would be maintained.

The pump-turbine 10 may be operated in the following manner. The flow of water through the spiral casing 12 is controlled by the position of the wicket gates 16, which are positionable by means of the shifting ring 22. The water flows through the blades 40 and discharges through the discharge ring 26 into the draft tube 28. Rotary motion is imparted to the blades 40 by such water flow. The rotary motion is transmitted by the shaft 30 to any suitable driven mechanism which is usually an electric generator.

The shifting ring 22 is mounted on the casing above cover plate 37 and is preferably operated by servo-motors responsive to the rotor speed as is well known and therefore, not shown.

Water may enter the spaces 50 and 52 through the peripheral runner clearance. The water in the spaces 50 and 52 is trapped to some extent by the small restraining clearances at the runner seals 60 and since such water is in contact with the rotating runner surfaces, it has imparted to it a varying degree of whirling or vortex flow caused by such contact. The stationary vanes 58 mounted on the cover plate 37 obstruct the rotating flow near the periphery of the cover plate 37. This results in a more static and therefore a higher more uniform pressure distribution on top of the runner. Thus, the downward force on the runner is increased by the effect of the stationary vanes 58. Conversely, vanes attached to the top of the runner would increase rotating flow or vortex action and would therefore reduce the downward force on the top of the runner.

The vanes 54 connected to the discharge band 42 rotate with the runner 14 and increase the water rotation within the space 50. This results in an increase in the centrifugal pressure distribution characteristics within the space 50. This results in a reduction of excessive or all upward thrust below the runner 14. Conversely, vanes attached to the housing members would decrease water rotation within the space 50 and increase the upward thrust below the runner 14.

Thus, excessive or all upward thrust in accordance with the desired characteristics is avoided and a steady and positive downward thrust may be maintained on the thrust bearing 32, which is designed for this purpose. Periodic lifting of the runner from the thrust bearing 32 is avoided so that dynamic disturbances and eventual damage to both upward and downward thrust bearings is substantially prevented.

The present invention may be embodied in other specific forms without departing from the spirit or essential attributes thereof and, accordingly, reference should be made to the appended claims, rather than to the foregoing specification as indicating the scope of the invention.

I claim:

1. A pump-turbine comprising a rotatable shaft, a runner connected to said rotatable shaft, a cover plate mounted over said runner and stationary with respect thereto, a stationary housing stationary with respect to said runner, said runner including a plurality of blades fixedly connected thereto, a band integrally connected to the end of said blades, said runner and said cover plate cooperating to define a first space therebetween, said band and said stationary housing cooperating to define a second space therebetween, at least one vane connected to said cover plate in said first space, and at least one vane connected to said band in said second space.

2. A pump-turbine as set forth in claim 1 wherein water may be trapped in said first and second spaces, and wherein said vane connected to said cover plate is juxtaposed to the outer periphery of said runner and causes said water to create a downward force on said runner, and said vane in said second space is juxtaposed to the outer periphery of said runner and minimizes upward pressure on said runner by the water trapped in said second space.

3. A pump-turbine as set forth in claim 2 wherein said vane on said cover plate is pivotable and retractable.

4. A pump-turbine comprising a runner, a rotatable shaft connected to said runner, said runner including a plurality of blades, a stationary cover plate mounted over said runner, said cover plate and said runner defining a space therebetween, means in said space for increasing the downward pressure distribution of water which is trapped in said space, a discharge band connected to the ends of said blades, said pump-turbine including a stationary housing, said housing and said discharge band defining a second space therebetween, means in said second space for increasing the centrifugal pressure distribution of water which is trapped in said second space, said means in said second space comprising a plurality of rotatable vanes pivotally connected to said discharge band.

5. An hydraulic machine comprising a runner, a rotatable shaft connected to said runner, means defining first and second spaces above and below said runner respectively in which water may be trapped, means in said first space for increasing the downward pressure on said runner to the trapped water therein, means in said second space for decreasing the upward pressure on said runner to the trapped water therein, said means in said first space including a plurality of vanes connected to a cover plate, and said means in said second space comprising a plurality of vanes pivotally connected to said runner, wherein said vanes in said first space may be retracted into pockets provided in said cover plate.

6. A pump-turbine comprising a runner, a rotatable shaft connected to said runner, said runner including a plurality of blades, a stationary cover plate mounted over said runner, said cover plate and said runner defining a space therebetween, means in said space for increasing the downward pressure distribution of water which is trapped in said space, said means comprising a plurality of vanes pivotally connected to said stationary cover plate, and said cover plate being provided with pockets into which the vanes may be retracted and means for retracting the vanes into said pockets.

References Cited

UNITED STATES PATENTS

| 634,840 | 10/1899 | Warring | 103—112 |
| 922,216 | 5/1909 | Uhl | 253—117 X |
| 1,516,822 | 11/1924 | McCormack | 253—117 |

FOREIGN PATENTS

| 9,985 | 11/1902 | Austria. |
| 384,675 | 2/1908 | France. |
| 29,524 | 10/1905 | Germany. |

MARTIN P. SCHWADRON, *Primary Examiner.*

EVERETT A. POWELL, Jr., *Examiner.*